(12) United States Patent
Woo et al.

(10) Patent No.: US 9,945,991 B2
(45) Date of Patent: Apr. 17, 2018

(54) LIGHT-SCATTERING SHEET, ELECTRONIC DEVICE COMPRISING SAME, AND METHOD FOR PRODUCING SAME

(71) Applicant: LG CHEM, LTD., Seoul (KR)

(72) Inventors: Seung A Woo, Daejeon (KR); Young Whan Park, Daejeon (KR); Sung Kyung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 303 days.

(21) Appl. No.: 14/915,878

(22) PCT Filed: Sep. 16, 2014

(86) PCT No.: PCT/KR2014/008626
§ 371 (c)(1),
(2) Date: Mar. 1, 2016

(87) PCT Pub. No.: WO2015/037968
PCT Pub. Date: Mar. 19, 2015

(65) Prior Publication Data
US 2016/0195647 A1 Jul. 7, 2016

(30) Foreign Application Priority Data

Sep. 16, 2013 (KR) .................. 10-2013-0111443

(51) Int. Cl.
*G02B 5/02* (2006.01)
*F21V 8/00* (2006.01)
*G02F 1/1335* (2006.01)
*G02B 1/02* (2006.01)
*G02B 1/04* (2006.01)
*B82Y 20/00* (2011.01)

(52) U.S. Cl.
CPC .............. *G02B 5/0294* (2013.01); *F21V 9/30* (2018.02); *G02B 1/02* (2013.01); *G02B 1/04* (2013.01); *G02B 5/0236* (2013.01); *G02B 5/0242* (2013.01); *G02B 6/0051* (2013.01); *G02F 1/133504* (2013.01); *G02F 1/133606* (2013.01); *B82Y 20/00* (2013.01); *G02F 2001/133507* (2013.01); *G02F 2001/133614* (2013.01); *G02F 2202/108* (2013.01); *Y10S 977/774* (2013.01); *Y10S 977/95* (2013.01); *Y10S 977/952* (2013.01)

(58) Field of Classification Search
CPC ..................................................... G02B 5/0294
USPC ......................................................... 428/323
See application file for complete search history.

(56) References Cited

U.S. PATENT DOCUMENTS

| | | | |
|---|---|---|---|
| 9,543,481 B2 | 1/2017 | Pickett et al. | |
| 2006/0109682 A1 | 5/2006 | Ko et al. | |
| 2010/0283072 A1 | 11/2010 | Kazlas et al. | |
| 2012/0188746 A1* | 7/2012 | Lee .................. | B29D 11/00634 362/84 |
| 2012/0256141 A1 | 10/2012 | Nick et al. | |
| 2012/0286313 A1 | 11/2012 | Bergenek et al. | |
| 2014/0362556 A1 | 12/2014 | Cho et al. | |
| 2017/0022628 A1 | 1/2017 | Breen et al. | |

FOREIGN PATENT DOCUMENTS

| | | | |
|---|---|---|---|
| EP | 0 328 202 A2 | 8/1989 | |
| EP | 2487218 A1 | 8/2012 | |
| JP | 2010533976 A | 10/2010 | |
| JP | 2013505346 A | 2/2013 | |
| KR | 10-1989-0013720 A | 9/1989 | |
| KR | 10-2006-0056834 A | 5/2006 | |
| KR | 10-2010-0047841 A | 5/2010 | |
| KR | 10-2012-0018490 A | 3/2012 | |
| KR | 10-2012-0083388 A | 7/2012 | |
| KR | 10-2012-0091460 A | 8/2012 | |
| KR | 10-2012-0113191 A | 10/2012 | |
| WO | WO 2009/011922 | * | 1/2009 |
| WO | 2012/064562 A1 | 5/2012 | |
| WO | 2012164283 A1 | 12/2012 | |

OTHER PUBLICATIONS

Kavesh et al., "Meaning and Measurement of Crystallinity Polymers: A Review," Polymer Engineering and Science 9 (6): 452-460 (1969).
Office Action of Japanese Patent Office in Appl'n No. 2016-529729, dated Dec. 20, 2016.

* cited by examiner

*Primary Examiner* — Doris L Lee
(74) *Attorney, Agent, or Firm* — Dentons US LLP (57) ABSTRACT

Provided are a light scattering sheet, an electronic device comprising the same, and a method of manufacturing the same.

14 Claims, 8 Drawing Sheets

LIGHT-SCATTERING SHEET, ELECTRONIC DEVICE COMPRISING SAME, AND METHOD FOR PRODUCING SAME

TECHNICAL FIELD

This application is a National Stage Application of International Application No. PCT/KR2014/008626, filed on Sep. 16, 2014, which claims the benefit of Korean Patent Application No. 10-2013-0111443, filed on Sep. 16, 2013, all of which are hereby incorporated by reference in their entirety for all purposes as if fully set forth herein.

The present specification provides a light scattering sheet, an electronic device comprising the same, and a method of manufacturing the same.

BACKGROUND ART

A quantum dot (QD) is a semiconductor nanoparticle. The quantum dot having a nanometer size emits light while electrons in an unstable state fall from a conduction band to a valence band, light having a short wavelength is emitted as the size of the particle of the quantum dot is reduced, and light having a long wavelength is emitted as the size of the particle is increased. Accordingly, if the size of the quantum dot is adjusted, a visible ray having a desired wavelength may be exhibited, and various colors may be implemented simultaneously by using the quantum dots having various sizes.

A desired natural color may be implemented, a color reproduction range is good, and luminance is favorable by controlling the size of the quantum dot, and thus, lighting devices comprising the quantum dot have received attention as a next-generation device.

DETAILED DESCRIPTION OF THE INVENTION

Technical Problem

The present specification provides a light scattering sheet, an electronic device comprising the same, and a method of manufacturing the same.

Technical Solution

The present specification provides a light scattering sheet comprising: a light conversion layer, wherein the light conversion layer comprises a particle which comprises a polymer comprising a crystal domain; and quantum dots dispersed in the crystal domain of the polymer, and when a longest direction is defined as an X-axis, a direction that is vertical to the X-axis in a plane direction is defined as a Y-axis, and a direction that is vertical to the X-axis and the Y-axis in a thickness direction is defined as a Z-axis, a size of the particle is 0.1 μm or more and 50 μm or less in the X-axis, 0.1 μm or more and 50 μm or less in the Y-axis, and 0.1 μm or more and 50 μm or less in the Z-axis.

Further, the present specification provides an electronic device comprising the light scattering sheet.

Further, the present specification provides a lighting apparatus comprising the electronic device.

Further, the present specification provides a display apparatus comprising the electronic device.

Advantageous Effects

There is a merit in that a particle of an exemplary embodiment of the present specification converts a wavelength of incident light to generate light having a converted wavelength and scatter light.

The exemplary embodiment of the present specification has a merit in that the particles comprising quantum dots are uniformly distributed.

DESCRIPTION OF REFERENCE NUMERALS

600: Liquid crystal display
601: Brightness enhancing film
602: Light scattering sheet
604: Light scattering sheet
606: Light guide plate
608: Reflection plate
610: Light source
620: Upper barrier film
622: Lower barrier film

BEST MODE

Hereinafter, the present specification will be described in detail.

The present specification provides a light scattering sheet comprising a light conversion layer, in which the light conversion layer comprises a particle which comprises a polymer comprising a crystal domain; and quantum dots dispersed in the crystal domain of the polymer, and when a longest direction is defined as an X-axis, a direction that is vertical to the X-axis in a plane direction is defined as a Y-axis, and a direction that is vertical to the X-axis and the Y-axis in a thickness direction is defined as a Z-axis, a size of the particle is 0.1 μm or more and 50 μm or less in the X-axis, 0.1 μm or more and 50 μm or less in the Y-axis, and 0.1 μm or more and 50 μm or less in the Z-axis.

The particle may have a shape of a curved surface, and for example, may have a shape such as a sphere, an oval, and a disc, but the shape of the particle is not limited thereto. Specifically, the shape of the particle may be an oval or a disc.

A length of the X-axis of the particle may be larger than a length of the Y-axis.

The length of the X-axis of the particle may be larger than a length of the Z-axis.

The length of the X-axis of the particle may be larger than the length of the Y-axis and may be larger than the length of the Z-axis.

The length of the X-axis of the particle may be 1 μm or more and 20 μm or less.

The length of the Y-axis of the particle may be 0.1 μm or more and 10 μm or less.

The length of the Z-axis of the particle may be 0.1 μm or more and 10 μm or less.

The size of the particle may be 1 μm or more and 20 μm or less in the X-axis, 0.1 μm or more and 10 μm or less in the Y-axis, and 0.1 μm or more and 10 μm or less in the Z-axis.

The size of the particle is 1 μm or more and 20 μm or less in the X-axis, 0.1 μm or more and 10 μm or less in the Y-axis, and 0.1 μm or more and 10 μm or less in the Z-axis, and the length of the X-axis of the particle may be larger than the length of the Y-axis and may be larger than the length of the Z-axis.

The particles mean particles where the quantum dots are uniformly dispersed between the polymer chains provided between the crystals in the crystal domain through a recrystallization process of dissolving the polymer comprising the crystal domain in a solvent to increase a distance between the polymer chains, allowing the quantum dots to permeate a widened portion between the polymer chains and performing cooling to reduce the distance between the polymer chains.

In an exemplary embodiment of the present specification, the crystallinity of the recrystallized polymer may be 50% or more. There is a merit in that since the crystal domain and a non-crystal domain coexist in the polymer, the polymer where a ratio of the crystal domain of the recrystallized polymer is 50% or more is used, and thus the quantum dots are uniformly dispersed in the particles.

In an exemplary embodiment of the present specification, the crystallinity of the recrystallized polymer may be 70% or more. There is a merit in that since the crystal domain and the non-crystal domain coexist in the polymer, and the non-crystal domain corresponds to a portion connecting one crystal domain and another crystal domain, the quantum dots are mostly dispersed in the crystal domain, and thus the quantum dots are uniformly dispersed in the particles.

In the present specification, the particle may convert the wavelength of incident light to generate light having the converted wavelength and scatter light. Specifically, scattering of light may occur due to the size of the particle itself, and scattering of light may occur due to a difference between refractive indexes of the polymer where a curable resin is cured, the polymer constituting the aforementioned particles, and the quantum dot in the light scattering sheet.

In the present specification, since the particles may convert the wavelength of incident light to generate light having the converted wavelength and scatter light, even though an additional light scattering layer is not provided or light scattering particles are not added, there is a merit in that predetermined or more light efficiency is maintained.

In the exemplary embodiment of the present specification, quantum efficiency of the light conversion layer may be 0.05 or more and 0.95 or less.

In the exemplary embodiment of the present specification, a thickness of the light conversion layer may be 10 μm or more and 500 μm or less.

The quantum dots are dispersed between the polymer chains provided between the crystals in the crystal domain. Accordingly, there is a merit in that an agglomeration phenomenon due to affinity between the quantum dots is reduced, and thus the size of the quantum dot existing in the particle is small and the quantum dots are uniformly distributed.

In the exemplary embodiment of the present specification, the size of the quantum dot distributed in the particle may be 1 nm or more and 10 nm or less. In this case, there is a merit in that strong light is generated in a narrow wavelength band as compared to a fluorescent substance.

In the exemplary embodiment of the present specification, the content of the quantum dots may be 1 wt % to 45 wt % based on the total weight of the particles.

In the exemplary embodiment of the present specification, the content of the particles may be 0.1 wt % to 60 wt % based on the total weight of the light scattering sheet.

The light conversion layer may comprise two or more light conversion layers, and the two or more light conversion layers may convert the wavelengths of individually incident light to different wavelengths.

The light conversion layer may convert the wavelength of incident light to generate white light.

The light conversion layer may comprise two light conversion layers, and the light conversion layer may comprise a first light conversion sheet converting the wavelength of blue light to generate red light; and a second light conversion sheet converting the wavelength of blue light to generate green light.

In another exemplary embodiment of the present specification, a device comprising the light scattering sheet where the quantum dots are uniformly dispersed may minimize direct heat transfer and emit light by small energy during driving.

There is a merit in that the quantum dots in the light scattering sheet of the present specification are well wrapped by the chains provided between the crystals in the crystal domain of the polymer.

There is a merit in that the quantum dots in the light scattering sheet of the present specification are stable to a change in external environment. Specifically, there is a merit in that the quantum dots are stable to a change in temperature, contact with moisture or oxygen, and the like.

There is a merit in that the quantum dots in the light scattering sheet of the present specification are wrapped by the chains provided between the crystals in the crystal domain of the polymer to be stably dispersed.

Another exemplary embodiment of the present specification further comprises a barrier film provided on at least one surface of both surfaces of the light scattering sheet.

The present specification provides an electronic device comprising the light scattering sheet.

The electronic device may be any one of a plasma display panel (PDP), a light emitting diode (LED), an organic light emitting diode (OLED), a liquid crystal display (LCD), a thin film transistor-liquid crystal display (LCD-TFT), and a cathode ray tube (CRT).

Further, the present specification provides a display apparatus comprising the electronic device.

The display apparatus comprises a backlight unit and a pixel portion, and the electronic device of the present specification may be comprised in at least one of the backlight unit and the pixel portion.

Further, the present specification provides a lighting apparatus comprising the electronic device.

The lighting apparatus may be a white lighting apparatus or a colored lighting apparatus. In this case, a light emitting color of the electronic device of the present specification may be adjusted according to a required lighting color to comprise the electronic device in the lighting apparatus.

Further, the present specification provides a light scattering sheet for a liquid crystal display.

The present specification provides a liquid crystal display comprising the light scattering sheet.

The liquid crystal display may comprise a light source, a reflection plate, and a light guide plate, and may further comprise the light scattering sheet for the liquid crystal display of the present specification provided on the light guide plate.

Figure 4:
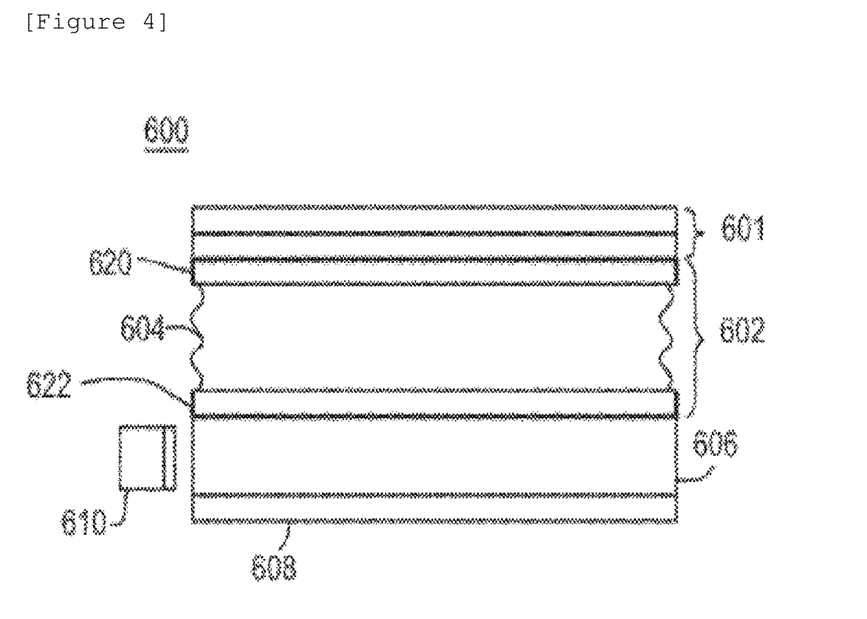
FIG. 4 is a cross-sectional view of a liquid crystal display comprising a light scattering sheet according to an exemplary embodiment of the present specification.

As illustrated in FIG. 4, a liquid crystal display 600 may comprise a light source 610, a reflection plate 608, and a light guide plate 606, and may further comprise a light scattering sheet 604 for the liquid crystal display of the present specification provided on the light guide plate 606.

In the exemplary embodiment of the present specification, the liquid crystal display may comprise a light source, a reflection plate, a light guide plate, and a brightness enhancing film, and may further comprise the light scattering sheet for the liquid crystal display of the present specification provided between the light guide plate and the brightness enhancing film.

In the exemplary embodiment of the present specification, the liquid crystal display may comprise a light source, a reflection plate, a light guide plate, a diffusion plate, and a brightness enhancing film, and may further comprise the light scattering sheet for the liquid crystal display of the present specification provided between the diffusion plate and the brightness enhancing film.

In the exemplary embodiment of the present specification, the liquid crystal display may comprise a reflection plate, a light guide plate, a diffusion plate, and a brightness enhancing film while using a blue light emitting diode (LED), and may further comprise the light scattering sheet for the liquid crystal display of the present specification provided between the diffusion plate and the brightness enhancing film.

There is a merit in that in the case where the light scattering sheet for the liquid crystal display is applied to the liquid crystal display, a color reproduction ratio and luminance are increased.

The present specification provides a method of manufacturing a light scattering sheet, comprising:

1) manufacturing a mixture solution of a polymer comprising a crystal domain and a solvent;

2) increasing a temperature of the mixture solution to a temperature at which the polymer is dissolved in the solvent;

3) adding quantum dots to the mixture solution and then cooling the mixture solution to generate particles where the polymer is recrystallized; and 4) manufacturing the light scattering sheet by using a composition comprising the particles formed in step 3).

The method of manufacturing the light scattering sheet of the present specification comprises 1) manufacturing the mixture solution of the polymer comprising the crystal domain and the solvent.

In general, the polymer comprises the crystal domain where the polymer chains are regularly arranged and the non-crystal domain where the polymer chains are irregularly arranged. The crystal domain of the polymer has a significantly regular molecule arrangement and exhibits an apparent crystal structure by X-ray diffraction.

The crystal domain of the polymer means a portion where the polymer chains are regularly arranged, and in terms of a shape thereof, the polymer chains may be arranged in various shapes according to interaction between the polymer chains, an environmental condition in which a crystal is formed, the degree of elongation, and the like, and the arranged shape of the polymer chains is not limited.

Figure 1:
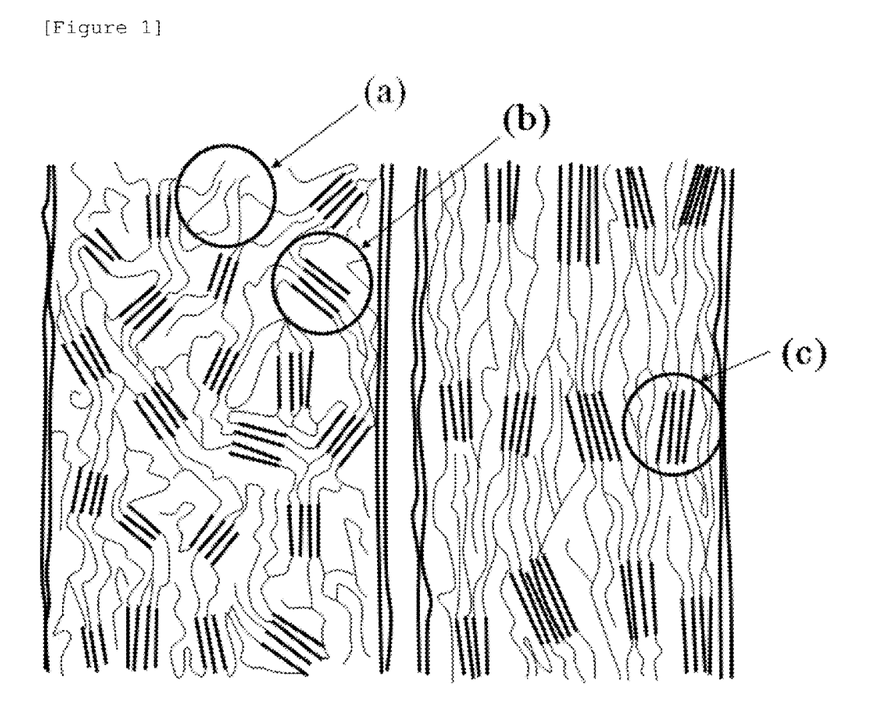
FIG. 1 illustrates a polymer comprising a crystal domain where polymer chains are longitudinally stretched to be regularly arranged.
Figure 2:
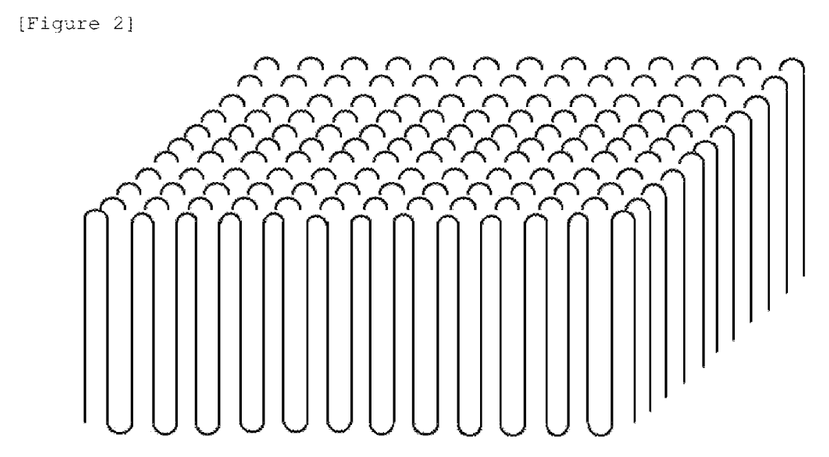
FIG. 2 illustrates a lamella structure formed by the repeatedly folded polymer chains.

For example, as illustrated in FIG. 1B or 1C, the polymer chains may be longitudinally stretched to be regularly arranged, or as illustrated in FIG. 2, a laminated structure such as lamella formed of repeatedly folded polymer chains may be formed.

A kind of the polymer is not particularly limited as long as the polymer comprises the crystal domain, but for example, the polymer may be a homopolymer of one of a polyvinyl chloride-based polymer, a polystyrene-based polymer, a polyolefin-based polymer, a nylon-based polymer, an acryl-based polymer, a phenol-based polymer, a melamine-based polymer, a silicon-based polymer, and polyimide-based, polyamide-based, polyurethane-based, polyester-based, and polycarbonate-based polymers, or a copolymer of at least two of the polymers.

Specifically, the polymer may be a homopolymer of one of a polyvinyl chloride-based polymer, a polyethylene-based polymer, a polypropylene-based polymer, a nylon-based polymer, and a polyacrylonitrile-based polymer, or a copolymer of at least two of the polymers.

Figure 3:
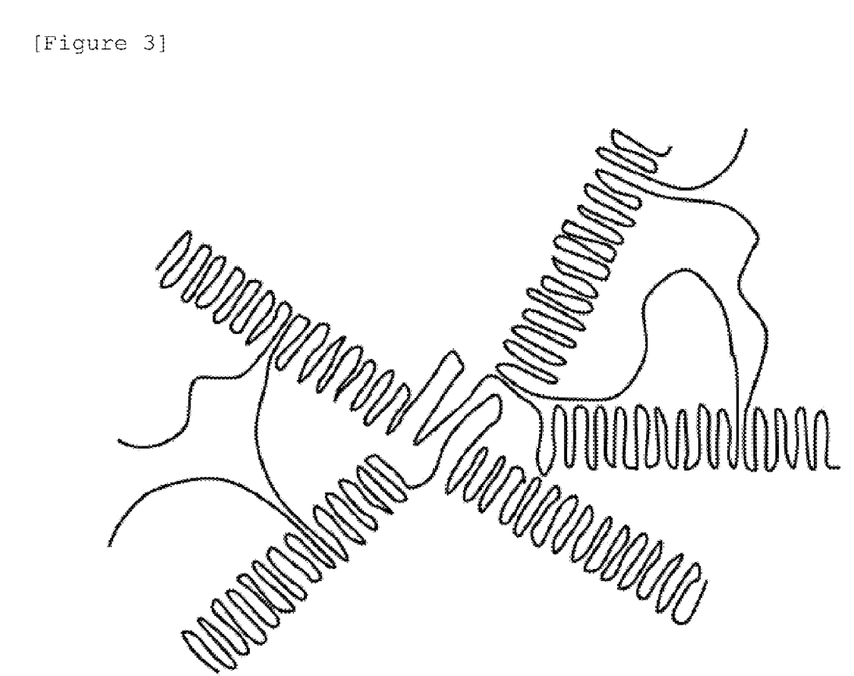
FIG. 3 illustrates the polymer comprising the crystal domain having the lamella structure.

The case where the polymer is entirely formed of the crystal like metal is infrequent, and as illustrated in FIGS. 1 and 3, mostly, the crystal domain and the non-crystal domain coexist therein. In this case, a ratio (percentage) of the crystal domain based on the entire polymer may be represented by the crystallinity of the polymer.

In the exemplary embodiment of the present specification, the polymer may be a crystalline polymer where the crystal domain exists in a relatively greater amount than the non-crystal domain.

In the exemplary embodiment of the present specification, the higher the crystallinity of the polymer is, the more preferable the light scattering sheet is. This is because the quantum dots permeate between the polymer chains provided between the crystals in the crystal domain of the polymer to be more uniformly distributed as the amount of the crystal domains of the polymer is increased.

In the exemplary embodiment of the present specification, the crystallinity of the polymer may be 50% or more. There is a merit in that since the crystal domain and the non-crystal domain coexist in the polymer, the polymer where a ratio of the crystal domain of the polymer is 50% or more is used, and thus the quantum dots are uniformly dispersed in the particles.

In the exemplary embodiment of the present specification, the polymer may have a curable reactive group. The polymer may have the reactive group that can be thermally cured or photo-cured in a curing step of step 5) to be described below.

The curable reactive group is not particularly limited as long as the curable reactive group may be cured through thermal curing or photo-curing, but for example, the curable reactive group may be a reactive group comprising a multiple bond such as an acrylate group and a vinyl group, or a reactive group comprising a cyclic bond such as epoxy.

In the exemplary embodiment of the present specification, the polymer may have a hydrophilic reactive group. The hydrophilic reactive group of the polymer interacts with the quantum dots permeating between the polymer chains provided between the crystals in the crystal domain to help the quantum dots to be stably disposed between the polymer chains provided between the crystals in the crystal domain. Specifically, since the quantum dots have hydrophilicity, the quantum dots reaching between the polymer chains provided between the crystals in the crystal domain interact with the hydrophilic reactive group of the polymer not to escape from the portion between the polymer chains but to be situated therein. In this case, interaction of the quantum dots and the hydrophilic reactive group of the polymer may form a chemical bond such as a covalent bond, a coordinate bond, an ionic bond, a hydrogen bond, and a polar bond according to the hydrophilic reactive group.

In the case of the hydrophilic reactive group of the polymer, the polymer itself may have the hydrophilic reactive group, or the hydrophilic reactive group may be added through treatment such as acid treatment.

The hydrophilic reactive group means the reactive group having high affinity with water, and generally, may be a reactive group that can perform hydrogen bonding, a reactive group having high polarity, or the like. For example, the reactive group may be —OH, —COOH, —O—, —CO—, —NH$_2$, —CONH$_2$, —PO$_3$H$_2$, —SH, —SO$_3$H, —SO$_2$H, —NO$_2$, —O(CH$_2$CH$_2$O)$_n$H (in this case, n is an integer of 1 to 5), and the like.

A matter that can be used in this technical field may be used as the solvent, and the solvent is not particularly limited.

The method of manufacturing the light scattering sheet of the present specification comprises 2) increasing the temperature of the mixture solution to the temperature at which the polymer is dissolved in the solvent.

A dissolution temperature of the polymer means a temperature at which the polymer is completely dissolved in the solvent to form a polymer solution, which means that after a structure of the existing polymer is completely decomposed, a novel crystal is formed anew to increase purity of the crystal domain. Therefore, interaction between the polymer and the solvent more largely occurs than interaction between the polymers.

In step 2), since interaction between the polymer and the solvent more largely occurs by increasing the temperature of the mixture solution to the dissolution temperature of the polymer or more, the quantum dots added in step 3) may permeate between the polymer chains.

In the exemplary embodiment of the present specification, the polymer having the polymer dissolution temperature of 70° C. or more and 180° C. or less may be used. There is a merit in that since stress in the quantum dots is increased as the temperature is increased, thermal stability of the quantum dots may be maintained by using the polymer having the relatively low polymer dissolution temperature.

The method of manufacturing the light scattering sheet of the present specification comprises 3) adding the quantum dots to the mixture solution and then cooling the mixture solution to generate the particles where the polymer is recrystallized.

In step 3), immediately before the mixture solution is cooled, the quantum dots may be added to the mixture solution. This step is configured to prevent the quantum dots from being agglomerated due to affinity between the quantum dots before the quantum dots permeate between the polymer chains totally having hydrophobicity and thus well mix the polymer chains and the quantum dots.

When the quantum dots are added to the mixture solution, the quantum dots may be added while the mixture solution is stirred. This is configured to prevent agglomeration of the quantum dots due to affinity between the quantum dots and minimize stress in the quantum dots through heat treatment.

When the recrystallized particles of the polymer are generated by cooling the mixture solution, the crystal of the polymer is generated while the portion between the polymer chains becomes narrow in a state where the quantum dots are uniformly dispersed. In this case, the recrystallized particles of the polymer are particles recrystallized in a state where the quantum dots are dispersed between the polymer chains provided between the crystals in the crystal domain of the polymer.

In the exemplary embodiment of the present specification, the recrystallized polymer may be a crystalline polymer where the crystal domain exists in a relatively greater amount than the non-crystal domain.

In the exemplary embodiment of the present specification, the higher the crystallinity of the recrystallized polymer is, the more preferable the light scattering sheet is. This is because the quantum dots permeate the portion between the polymer chains provided between the crystals in the crystal domain of the polymer to be more uniformly distributed as the amount of the crystal domains of the polymer is increased.

In an exemplary embodiment of the present specification, the crystallinity of the recrystallized polymer may be 50% or more. There is a merit in that since the crystal domain and the non-crystal domain coexist in the polymer, the polymer where a ratio of the crystal domain of the polymer is 50% or more is used, and thus the quantum dots are uniformly dispersed in the particles.

In an exemplary embodiment of the present specification, the crystallinity of the recrystallized polymer may be 70% or more. There is a merit in that since the crystal domain and the non-crystal domain coexist in the polymer, and the non-crystal domain corresponds to a portion connecting one crystal domain and another crystal domain, the quantum dots are mostly dispersed in the crystal domain, and thus the quantum dots are uniformly dispersed in the particles.

In the exemplary embodiment of the present specification, a weight ratio of the polymer and the quantum dot in the mixture solution of step 3) may be 100:1 or more and 100:90 or less. More specifically, the weight ratio may be 100:1 or more and 100:50 or less.

The quantum dot means semiconductor nano-crystal that can convert the wavelength of incident light into another wavelength.

A kind of the quantum dot is not particularly limited as long as the quantum dot can convert the wavelength of incident light into another wavelength, and a general quantum dot in this technical field may be used. For example, the quantum dot may be a Si-based nano-crystal, a Group II-VI-based compound semiconductor nano-crystal, a Group II-V-based compound semiconductor nano-crystal, a Group III-V-based compound semiconductor nano-crystal, a Group I-III-VI-based compound semiconductor nano-crystal, a Group I-III-V-based compound semiconductor nano-crystal, or a Group IV-VI-based compound semiconductor nano-crystal.

The Group II-VI-based compound semiconductor nano-crystal may be any one of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe.

The Group III-V-based compound semiconductor nano-crystal may be any one of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs.

The Group IV-VI-based compound semiconductor nanocrystal may be any one of lead sulfide (PbS), lead selenide (PbSe), lead telluride (PbTe), tin sulfide (SnS), tin selenide (SnSe), and tin telluride (SnTe).

The Group II-V-based compound semiconductor nanocrystal may be any one of zinc phosphide ($Zn_3P_2$), zinc arsenide ($Zn_3As_2$), cadmium phosphide ($Cd_3P_2$), cadmium arsenide ($Cd_3As_2$), cadmium nitride ($Cd_3N_2$), and zinc nitride ($Zn_3N_2$).

The Group I-III-V-based compound semiconductor nanocrystal may be any one of $CuInSe_2$ and $Cu(In,Ga)Se_2$.

In the exemplary embodiment of the present specification, the size of recrystallized particle is determined according to a cooling speed and an agitation speed in step 3).

In step 3), the size of the particle is reduced as the cooling speed and the agitation speed are increased. This is because there is relatively little time to grow the recrystallized particles of the polymer.

In step 3), the size of the particle is increased as the cooling speed and the agitation speed are reduced. This is because there is relatively much time to grow the recrystallized particles of the polymer.

Since a final cooling temperature is relatively low, if a temperature difference is large, the cooling speed thereof becomes fast, and on the contrary, since the final cooling temperature is high, if the temperature difference is small, the cooling speed thereof becomes slow.

In the exemplary embodiment of the present specification, the agitation speed of step 3) may be 50 rpm or more and 1000 rpm or less.

In the exemplary embodiment of the present specification, a difference between the increased final temperature of step 2) and the final cooling temperature of step 3) (recrystallization temperature) may be 20° C. or more and 150° C. or less. Specifically, the difference between the increased final temperature of step 2) and the final cooling temperature of step 3) (recrystallization temperature) may be 20° C. or more and 50° C. or less.

In the exemplary embodiment of the present specification, the cooling speed of step 3) may be 1° C./min or more and 180° C./min or less.

A method of cooling the mixture solution in step 3) may adopt a method generally used in this technical field, and for example, a vessel where the mixture solution is contained may be put into another vessel where a solvent such as water is contained to be indirectly cooled.

The particle generated in step 3) has a shape of a curved surface, and for example, has a shape such as a sphere, an oval, and a discus, but the shape of the particle is not limited thereto.

In the exemplary embodiment of the present specification, when a longest direction is defined as an X-axis, a direction that is vertical to the X-axis in a plane direction is defined as a Y-axis, and a direction that is vertical to the X-axis and the Y-axis in a thickness direction is defined as a Z-axis, a size of the particle formed in step 3) may be 0.1 μm or more and 50 μm or less in the X-axis.

In the exemplary embodiment of the present specification, when the longest direction is defined as the X-axis, the direction that is vertical to the X-axis in the plane direction is defined as the Y-axis, and the direction that is vertical to the X-axis and the Y-axis in the thickness direction is defined as the Z-axis, the size of the particle formed in step 3) may be 0.1 μm or more and 50 μm or less in the Y-axis.

In the exemplary embodiment of the present specification, when the longest direction is defined as the X-axis, the direction that is vertical to the X-axis in the plane direction is defined as the Y-axis, and the direction that is vertical to the X-axis and the Y-axis in the thickness direction is defined as the Z-axis, the size of the particle formed in step 3) may be 0.1 μm or more and 50 μm or less in the z-axis.

The exemplary embodiment of the present specification may further comprise washing the particles after step 3).

Here, a method of washing the formed particles is not particularly limited, but a general method in this technical field may be used. For example, in order to wash the particles, a step of separating the formed particles from the solvent by using a centrifuge and dispersing the particles again in a novel solvent may be repeated.

The exemplary embodiment of the present specification may further comprise performing sonication of the particles after step 3).

The method of manufacturing the light scattering sheet of the present specification comprises 4) manufacturing the light scattering sheet by using a composition comprising the particles formed in step 3).

In the exemplary embodiment of the present specification, the content of the particles may be 0.1 wt % or more and 60 wt % or less based on the total weight of the composition.

The composition of step 4) may further comprise at least one of a photo-initiator, a curable resin, and a solvent.

A kind of the photo-initiator is not limited as long as the photo-initiator can perform initiation by light, and a matter generally used in this technical field may be used.

The curable resin is not particularly limited as long as the curable resin can be cured by radicals initiated by the photo-initiator, and a matter generally used in this technical field may be used.

For example, the curable resin may be an acrylate-based resin or a vinyl-based resin.

The solvent is not particularly limited, and a matter generally used in this technical field may be used.

In the exemplary embodiment of the present specification, in order to increase a coating thickness of the composition, the content of the solvent may be reduced, or the composition may further comprise the photo-initiator and the curable resin without the solvent.

In the exemplary embodiment of the present specification, the content of the photo-initiator may be 0.1 wt % or more and 5 wt % or less based on the total weight of the composition.

In the exemplary embodiment of the present specification, the content of the curable resin may be 10 wt % or more and 99 wt % or less based on the total weight of the composition.

In the exemplary embodiment of the present specification, the content of the solvent may be 0 wt % or more and 50 wt % or less based on the total weight of the composition.

In the exemplary embodiment of the present specification, the step 4) may further comprise performing sonication of the composition comprising the particles.

In the present specification, the method is not particularly limited as long as the light scattering sheet can be manufactured by using the composition, but for example, the composition may be applied on a substrate and cured to manufacture the light scattering sheet.

An application method on the substrate is not particularly limited as long as the composition can be applied in a uniform thickness on the substrate, and a method generally used in this technical field may be used. For example, the method may be bar coating, sputtering, or the like.

A material of the substrate is not particularly limited, but for example, the substrate may be a plastic substrate, a glass substrate, a silicon substrate, or the like.

A method of curing the composition applied on the substrate may be photo-curing or thermal curing, and non-limitingly, photo-curing is preferable.

A thickness of the light scattering sheet manufactured in step 4) may be 0.1 µm or more and 500 µm or less.

The light scattering sheet manufactured in step 4) may be a wavelength change sheet, which comprises two kinds or more quantum dots, or a wavelength change sheet, which comprises one kind of quantum dot.

In the exemplary embodiment of the present specification, the light scattering sheet manufactured in step 4) may be the wavelength change sheet, which comprises one kind of quantum dot.

A maximum peak wavelength of light converted by the light scattering sheet manufactured in step 4) may be 400 nm or more and 800 nm or less. In this case, the peak wavelength means a wavelength where the intensity of light emitting wavelength of the quantum dot is maximum.

The maximum peak wavelength of light converted by the light scattering sheet manufactured in step 4) may be 580 nm or more and 700 nm or less. In this case, light having maximum peak wavelength of 580 nm or more and 700 nm or less displays red light.

The maximum peak wavelength of light converted by the light scattering sheet manufactured in step 4) may be 500 nm or more and 560 nm or less. In this case, light having maximum peak wavelength of 500 nm or more and 560 nm or less displays green light.

The maximum peak wavelength of light converted by the light scattering sheet manufactured in step 4) may be 420 nm or more and 480 nm or less. In this case, light having maximum peak wavelength of 420 nm or more and 480 nm or less displays blue light.

In the exemplary embodiment of the present specification, a step of removing the substrate after the light scattering sheet is manufactured in step 4) may be further comprised.

The method of manufacturing the light scattering sheet of the present specification further comprises laminating two or more light scattering sheets manufactured in step 4).

A method of laminating two or more light scattering sheets is not particularly limited, and a method generally used in this technical field may be used.

For example, an adhesive layer may be formed between the two or more light scattering sheets to perform lamination. Application and curing of the composition on the manufactured light scattering sheet may be repeated one or more times to laminate the two or more light scattering sheets. The two or more light scattering sheets may be sequentially put thereon and heated to be attached.

In the exemplary embodiment of the present specification, the two or more light scattering sheets may convert the wavelengths of individually incident light to different wavelengths.

In the exemplary embodiment of the present specification, the individual light scattering sheets of the two or more light scattering sheets may comprise the same quantum dot. That is, the individual light scattering sheet may comprise one kind of the quantum dot.

In the exemplary embodiment of the present specification, the two or more light scattering sheets may convert the wavelength of incident light to generate white light.

In the exemplary embodiment of the present specification, the light scattering sheet may comprise two layers of light scattering sheets.

In the exemplary embodiment of the present specification, the light scattering sheet may comprise the two layers of the light scattering sheets, and the light scattering sheet may comprise a first light scattering sheet converting a wavelength of blue light to generate red light; and a second light scattering sheet converting the wavelength of blue light to generate green light.

In the exemplary embodiment of the present specification, a step of removing the substrate after the two or more light scattering sheets are laminated may be further comprised.

A specific description will be given in the following Examples. However, the following Examples are set forth to illustrate the present specification, but the scope of the present specification is not limited thereto.

Preparation Example 1

Manufacturing of Particles Comprising Quantum Dots Dispersed in Crystal Domain of Polymer 50 mg of the polyethylene wax was added in the 20 ml vial bottle, 5 g of toluene was added, and the solution was heated to 90° C. As soon as the temperature of the solution reached 90° C., 120 µl of the CdSe/ZnS red quantum dot solution having the appropriate concentration (standard: 25 mg/ml toluene) was injected. The vial bottle was put into the water bath at room temperature, the temperature of which was previously set, agitated for 1 minute (200 rpm), separated from the water bath, and left at room temperature for 4 minutes, and the stirring bar was separated from the vial bottle. After the vial bottle was left until being completely cooled, 20 g of the solution of the vial bottle was collected, and divided in the conical tube to perform centrifugation for washing (3000 rpm, 5 min). The supernatant was removed after centrifugation, toluene was added to the precipitated particles to make 20 g of the solution, and particles were redispersed by vortexing. The aforementioned washing process was repeated three times to completely remove unreacted materials.

Preparation Example 2

Preparation Example 2 was the same as Preparation Example 1, except that the temperature of the water bath, which was the recrystallization temperature, was changed to 25° C.

Preparation Example 3

Preparation Example 3 was the same as Preparation Example 1, except that the temperature of the water bath, which was the recrystallization temperature, was changed to 40° C.

Preparation Example 4

Preparation Example 4 was the same as Preparation Example 1, except that the temperature of the water bath, which was the recrystallization temperature, was changed to 50° C.

Preparation Example 5

Preparation Example 5 was the same as Preparation Example 1, except that the temperature of the water bath, which was the recrystallization temperature, was changed to 60° C.

Preparation Example 6

Preparation Example 6 was the same as Preparation Example 4, except that 120 µl of the CdSe/ZnS green quantum dot solution having the appropriate concentration (standard: 25 mg/ml toluene) was injected instead of 120 µl of the red quantum dot solution.

Preparation Example 7

Preparation Example 7 was the same as Preparation Example 4, except that 240 µl of the red quantum dot solution (CdSe/ZnS 25 mg/ml toluene) was injected instead of 120 µl of the red quantum dot solution.

Preparation Example 8

Preparation Example 8 was the same as Preparation Example 4, except that 240 µl of the green quantum dot solution (CdSe/ZnS 25 mg/ml toluene) was injected instead of 120 µl of the red quantum dot solution.

Preparation Example 9

Preparation Example 9 was the same as Preparation Example 4, except that 360 µl of the red quantum dot solution (CdSe/ZnS 25 mg/ml toluene) was injected instead of 120 µl of the red quantum dot solution.

Preparation Example 10

Preparation Example 10 was the same as Preparation Example 4, except that 360 µl of the green quantum dot solution (CdSe/ZnS 25 mg/ml toluene) was injected instead of 120 µl of the red quantum dot solution.

Example 1

Manufacturing of Light Scattering Sheet

When the light conversion layer was formed, 1.8 g of trimethylolpropane triacrylate (TMPTA) was used as the photo-curable resin. 0.018 g of IRG184 and 0.018 g of D-1173 were used as the photo-initiator. In this case, 0.318 g of the particles manufactured in Preparation Example 4 were used as the particles comprising the quantum dots. After the photo-curable resin, the photo-initiator, and the particles comprising the quantum dots were mixed to make the composition, sonication was performed for 35 minutes in order to increase dispersibility of the particles. Thereafter, the composition was applied on the polyethylene terephthalate (PET) film, and bar coating was then performed to manufacture the light scattering sheet where the light conversion layer was formed. In order to completely vaporize the solvent existing in the light conversion layer, the light conversion layer was put into the oven at 60° C. for 2 minutes and then cured in the UV curing machine (1000 mJ/cm$^2$).

Example 2

Example 2 was the same as Example 1, except that 1.8 g of 6-[[1-oxo-6-[(1-oxo-2-propen-1-yl)oxy]hexyl]oxy],1,1'-[oxybis[2,2-bis[[[1-oxo-6-[[1-oxo-6-[(1-oxo-2-propen-1-yl)oxy]hexyl]oxy]hexyl]oxy]methyl]-3,1-propanediyl]]ester (DPCA-120) was used instead of TMPTA as the photo-curable resin.

Example 3

Example 3 was the same as Example 1, except that 1.8 g of 9-ethylene glycol diacrylate (9-EGDA) was used instead of TMPTA as the photo-curable resin.

Comparative Example 1

When the light conversion layer was formed, 1.8 g of trimethylolpropane triacrylate (TMPTA) was used as the photo-curable resin, and 0.018 g of IRG184 and 0.018 g of D-1173 were used as the photo-initiator.

In this case, after 720 µl of the CdSe/ZnS red quantum dot solution (0.018 g) was added to make the composition, sonication was performed for 35 minutes in order to increase dispersibility of the quantum dots. Thereafter, the composition was applied on the polyethylene terephthalate (PET) film, and bar boating was then performed to manufacture the light scattering sheet comprising the light conversion layer. In order to completely vaporize the residual solvent existing in the light scattering sheet, the light scattering sheet was put into the oven at 60° C. for 2 minutes and then cured in the UV curing machine (1000 mJ/cm$^2$).

Experimental Example 1

Scanning electron microscope (SEM) measurement of particles comprising quantum dots dispersed in crystal domain of polymer.

In order to observe the recrystallization shape of the particles manufactured in Preparation Examples 1 to 5, the scanning electron microscope (SEM) measurement was performed. The result is illustrated in FIG. 7, and the temperature of the upper left displays a recrystallization temperature when the particles are manufactured.

Figure 7:
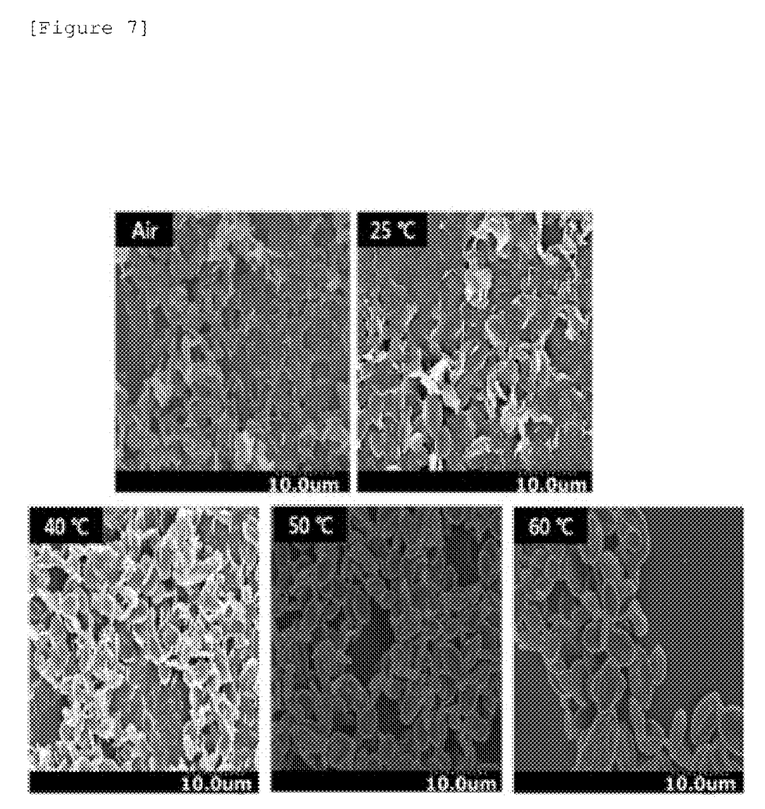
FIG. 7 is a scanning electron microscope (SEM) image of particles manufactured in Preparation Examples 1 to 5.

Reviewing the shape and the size of the particles illustrated in FIG. 7, it can be seen that the size and the thickness of the polyethylene particles can be adjusted according to a change in recrystallization temperature.

It was confirmed that the size and the thickness of the particles were gradually increased in proportion to the temperature of the water bath (recrystallization temperature). Specifically, it could be seen that in the case of the particles of Preparation Examples 1 and 2 obtained by adjusting the temperature of the water bath to room temperature and 25° C., since the particles had the various sizes and the very small thickness, the plate-shaped particles were formed. Furthermore, it was confirmed that in the case of the particles of Preparation Examples 3 to 5 obtained by adjusting the temperature of the water bath to 40° C. or more, the particles having the thickness of 0.7 µm or more in the Z-axis were formed.

It could be observed that the particles of Preparation Example 3 obtained by adjusting the temperature of the water bath to 40° C. had the size of 3.2 µm in the X-axis, 2 µm in the Y-axis, and 0.7 µm in the Z-axis. The particles of Preparation Example 4 obtained by adjusting the temperature of the water bath to 50° C. had the size of 4.0 µm in the X-axis, 2.3 µm in the Y-axis, and 1.4 µm in the Z-axis. The particles of Preparation Example 5 obtained by adjusting the temperature of the water bath to 60° C. had the size of 5.3 µm in the X-axis, 2.7 µm in the Y-axis, and 2.1 µm in the Z-axis.

Experimental Example 2

Transmission electron microscope (TEM) measurement of particles comprising quantum dots dispersed in crystal domain of polymer.

Figure 8:
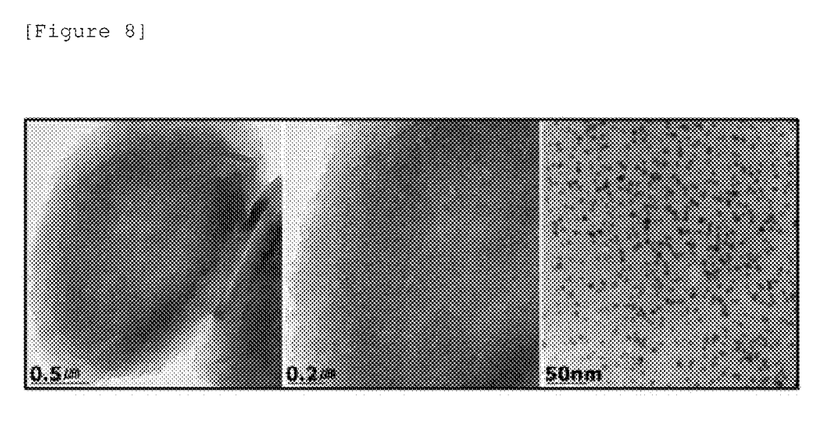
FIG. 8 is a transmission electron microscope image of particles manufactured in Preparation Example 1.

Transmission electron microscope measurement was performed in order to observe the quantum dots dispersed in polyethylene of Preparation Example 1, and is illustrated in FIG. 8. It can be seen that the quantum dots are not agglomerated in polyethylene but entirely dispersed well therethrough.

Experimental Example 3

Observation by Fluorescent Microscope

Figure 5:
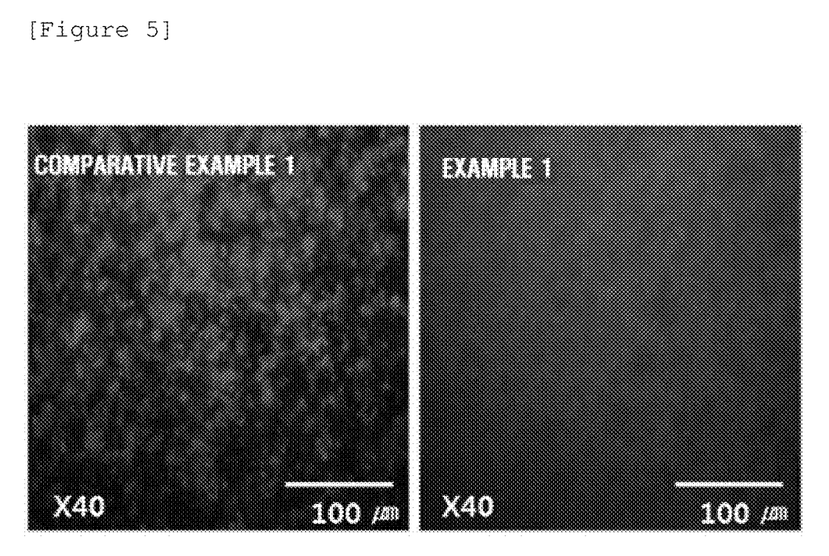
FIG. 5 is a fluorescent microscope image to light scattering sheets manufactured in Example 1 and Comparative Example 1.

The distribution and agglomeration states of the particles of the light scattering sheets manufactured in Example 1 and Comparative Example 1 were observed by the fluorescent microscope, and the result is illustrated in FIG. 5.

In the case of Comparative Example 1, it can be seen that dispersion of the quantum dots in the light scattering sheet is not uniform as compared to Example 1, and it can be confirmed that the quantum dots in the light scattering sheet are agglomerated to form a lump having very large particles and red light is displayed in only a portion at which the quantum dots are positioned.

In the case of Example 1, it is observed that in the case where the quantum dots are uniformly dispersed in the polyethylene particles unlike Comparative Example 1, the quantum dots are entirely uniformly dispersed well in the light scattering sheet without agglomeration of the quantum dots, and it can be confirmed that red light is displayed over the entire light scattering sheet due to scattering by the uniformly dispersed quantum dots.

Experimental Example 4

Photoluminescent Intensity of Light Scattering Sheet

Figure 6:
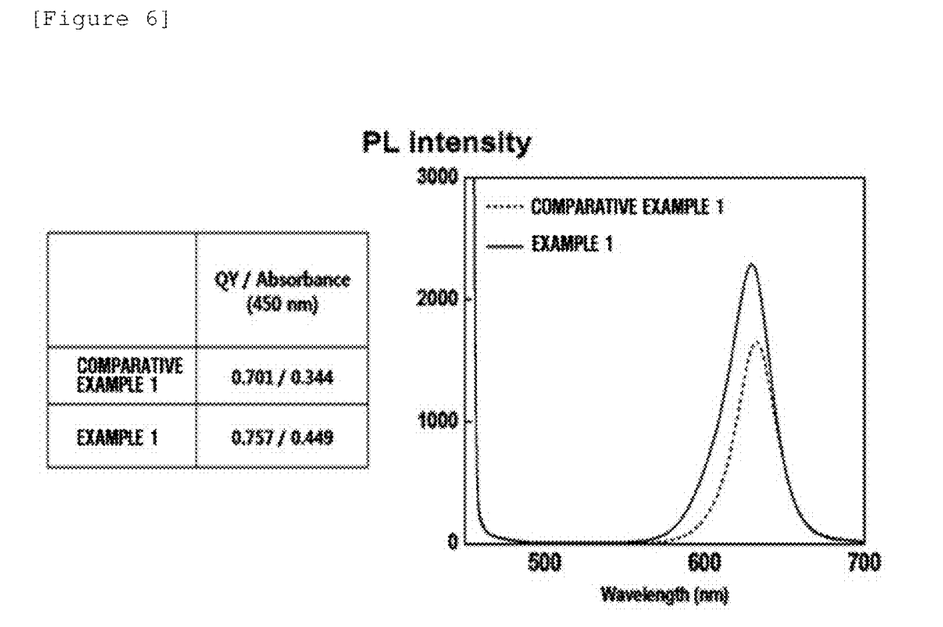
FIG. 6 is a graph illustrating a photoluminescent intensity of the light scattering sheets manufactured in Example 1 and Comparative Example 1.

The graph obtained by measuring the photoluminescent intensity of the light scattering sheets manufactured in Example 1 and Comparative Example 1 is illustrated in FIG. 6.

According to the graph illustrated in FIG. 6, it can be confirmed that even though the red quantum dots are contained in the same amount, in the case where the quantum dots are capsulated by the polyethylene particles, quantum efficiency and absorbance are increased, and thus the photoluminescent intensity is entirely high. This result exhibits that the polyethylene particles containing the quantum dots have a scattering effect.

The invention claimed is:

1. A light scattering sheet comprising:
   a light conversion layer,
   wherein the light conversion layer comprises a particle which comprises a polymer comprising a crystal domain; and quantum dots dispersed in the crystal domain of the polymer, and
   when a longest direction is defined as an X-axis, a direction that is vertical to the X-axis in a plane direction is defined as a Y-axis, and a direction that is vertical to the X-axis and the Y-axis in a thickness direction is defined as a Z-axis, a size of the particle is 0.1 µm or more and 50 µm or less in the X-axis, 0.1 µm or more and 50 µm or less in the Y-axis, and 0.1 µm or more and 50 µm or less in the Z-axis.

2. The light scattering sheet of claim 1, wherein the particle converts a wavelength of incident light to generate light having a converted wavelength and scatter light.

3. The light scattering sheet of claim 1, wherein light efficiency of the light conversion layer is 0.05 or more and 0.95 or less of quantum efficiency.

4. The light scattering sheet of claim 1, wherein a thickness of the light conversion layer is 0.1 µm or more and 500 µm or less.

5. The light scattering sheet of claim 1, wherein the quantum dots are dispersed between polymer chains provided between the crystals in the crystal domain.

6. The light scattering sheet of claim 1, wherein a size of the quantum dot is 1 nm or more and 10 nm or less.

7. The light scattering sheet of claim 1, wherein the crystallinity of the polymer is 50% or more.

8. The light scattering sheet of claim 1, wherein the light conversion layer comprises two or more light conversion layers, and the two or more light conversion layers convert wavelengths of individually incident light to different wavelengths.

9. The light scattering sheet of claim 1, wherein the light conversion layer converts a wavelength of incident light to generate white light.

10. The light scattering sheet of claim 1, wherein the light conversion layer comprises two light conversion layers, and the light conversion layer comprises a first light conversion sheet converting a wavelength of blue light to generate red light; and a second light conversion sheet converting the wavelength of blue light to generate green light.

11. The light scattering sheet of claim 1, further comprising:
    a barrier film provided on at least one surface of both surfaces of the light conversion sheet.

12. An electronic device comprising:
    the light scattering sheet of claim 1.

13. A lighting apparatus comprising:
    the electronic device of claim 12.

14. A display apparatus comprising:
    the electronic device of claim 12.

* * * * *